(12) United States Patent
To et al.

(10) Patent No.: US 7,936,789 B2
(45) Date of Patent: May 3, 2011

(54) DISPARATE CLOCK DOMAIN SYNCHRONIZATION

(75) Inventors: Hing (Thomas) Yan To, Cupertino, CA (US); Gregory Lemos, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1400 days.

(21) Appl. No.: 11/396,305

(22) Filed: Mar. 31, 2006

(65) Prior Publication Data

US 2007/0230509 A1    Oct. 4, 2007

(51) Int. Cl.
*H04J 3/06* (2006.01)
*H03L 7/06* (2006.01)

(52) U.S. Cl. .................................. 370/503; 327/146

(58) Field of Classification Search .................. None
See application file for complete search history.

(56) References Cited

U.S. PATENT DOCUMENTS

| | | | |
|---|---|---|---|
| 5,801,562 A * | 9/1998 | Fujii | 327/149 |
| 5,915,107 A * | 6/1999 | Maley et al. | 713/400 |
| 6,049,887 A * | 4/2000 | Khandekar et al. | 713/503 |
| 6,711,042 B2 * | 3/2004 | Ishikawa | 365/51 |
| 2003/0043766 A1 * | 3/2003 | McDonough et al. | 370/335 |
| 2003/0126356 A1 * | 7/2003 | Gustavson et al. | 711/105 |
| 2003/0227305 A1 * | 12/2003 | Mikhalev et al. | 327/141 |
| 2004/0141759 A1 * | 7/2004 | Stiscia et al. | 398/168 |
| 2004/0153924 A1 * | 8/2004 | Shinagawa et al. | 714/724 |
| 2004/0260961 A1 * | 12/2004 | Zhao et al. | 713/400 |
| 2005/0162338 A1 * | 7/2005 | Ikeda et al. | 345/2.1 |
| 2005/0243635 A1 * | 11/2005 | Schaefer | 365/227 |
| 2005/0271135 A1 * | 12/2005 | Shida | 375/232 |
| 2006/0001494 A1 * | 1/2006 | Garlepp et al. | 331/2 |
| 2007/0118711 A1 * | 5/2007 | Donnelly et al. | 711/167 |
| 2007/0140024 A1 * | 6/2007 | Perry et al. | 365/201 |
| 2008/0088349 A1 * | 4/2008 | Lee | 327/158 |

\* cited by examiner

*Primary Examiner* — Ricky Ngo
*Assistant Examiner* — Clemence Han
(74) *Attorney, Agent, or Firm* — Blakely, Sokoloff, Taylor & Zafman LLP

(57) ABSTRACT

Disparate clock domains are resynchronized after circuits in one of the clock domains awake from a reduced power state. Parallel test data is routed from a core circuit to a parallel-to-serial converter in an input/output (I/O) circuit. The parallel-to-serial converter clocks the parallel test data in response to a load signal. The load signal is varied until the clock domains are synchronized.

16 Claims, 7 Drawing Sheets

DISPARATE CLOCK DOMAIN SYNCHRONIZATION

FIELD

The present invention relates generally to integrated circuits, and more specifically to integrated circuits with multiple clock domains.

BACKGROUND

Integrated circuits such as processors, memory controllers, and memory devices typically include at least some digital circuitry that operates in response to a clock signal. Some integrated circuits may include some digital circuitry that operates in response to a first clock signal, and some digital circuitry that operates in response to a second clock signal. Different circuits that operate in response to different clock signals are said to be in different "clock domains." Clock domains may be considered separate, or "disparate," based on clock frequency differences, clock phase differences, locational differences, or the like. When circuits in various clock domains are powered up, link training may be performed to provide reliable communications between circuits in the different clock domains.

FIG. 1 shows a prior art system having integrated circuits with multiple clock domains. System 100 includes integrated circuits 110 and 150 interconnected by conductors 120 and 122. Integrated circuit 110 includes core circuit 112, input/output (I/O) circuit 114, and control circuit 116; and integrated circuit 150 includes core circuit 152, I/O circuit 154, and control circuit 156. Within integrated circuit 110, core circuit 112 and I/O circuit 114 are in different clock domains, and within integrated circuit 150, core circuit 152 and I/O circuit 154 are in different clock domains.

When power is supplied to system 100, the integrated circuits perform a link training operation to align clock and data signals between the core circuits and I/O circuits within the integrated circuits, and also on conductors 120 and 122 between the integrated circuits. For example, when power is applied, core circuit 112 may source training data that travels to I/O circuit 114, I/O circuit 154, core circuit 152, and then back. Likewise, core circuit 152 may source training data that travels to I/O circuit 154, I/O circuit 114, core circuit 112, and then back. Link training loops between the integrated circuits are formed to allow both integrated circuits to adjust both internal and external timing using their respective control circuits.

DESCRIPTION OF EMBODIMENTS

Figure 1:
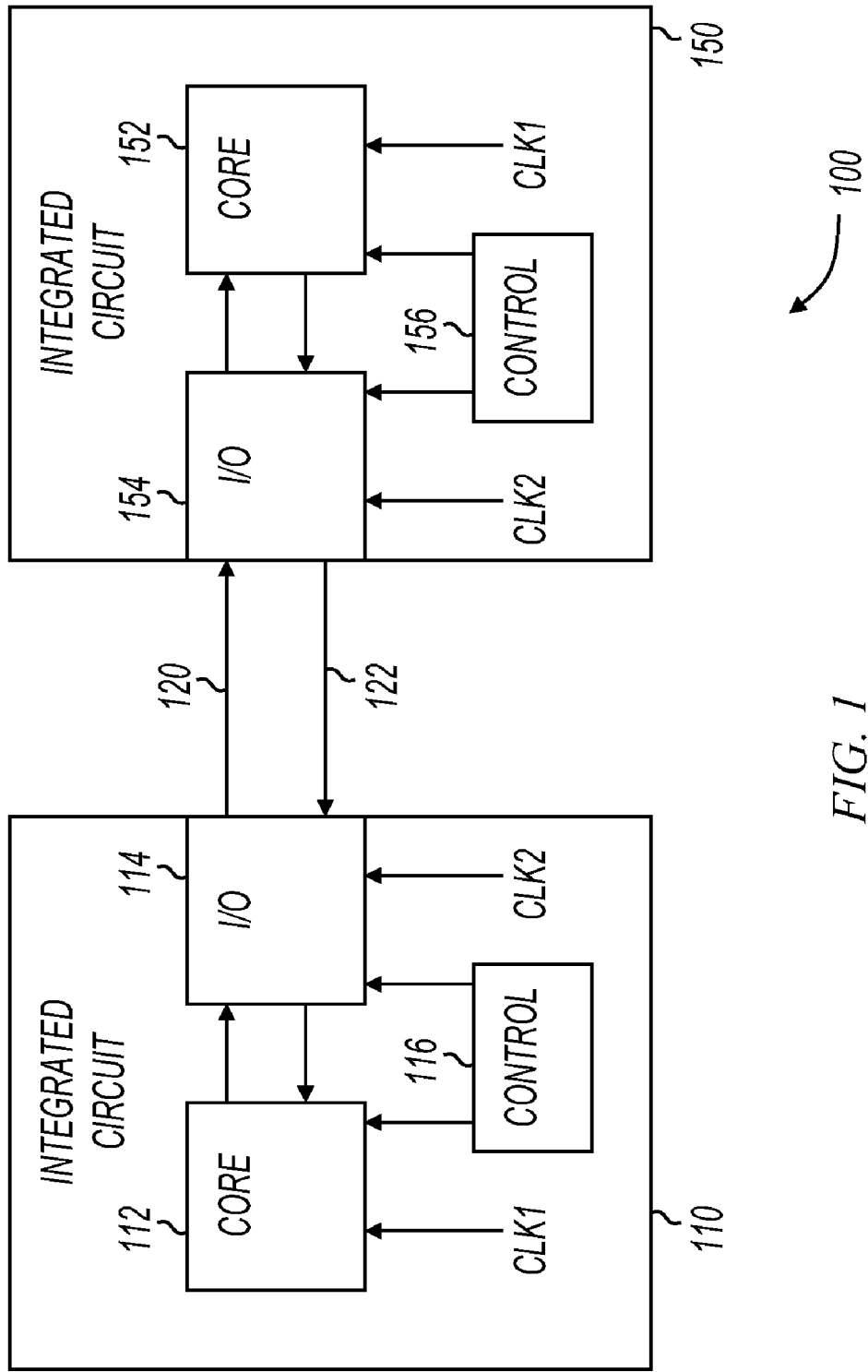
FIG. 1 shows a prior art system having integrated circuits with multiple clock domains.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
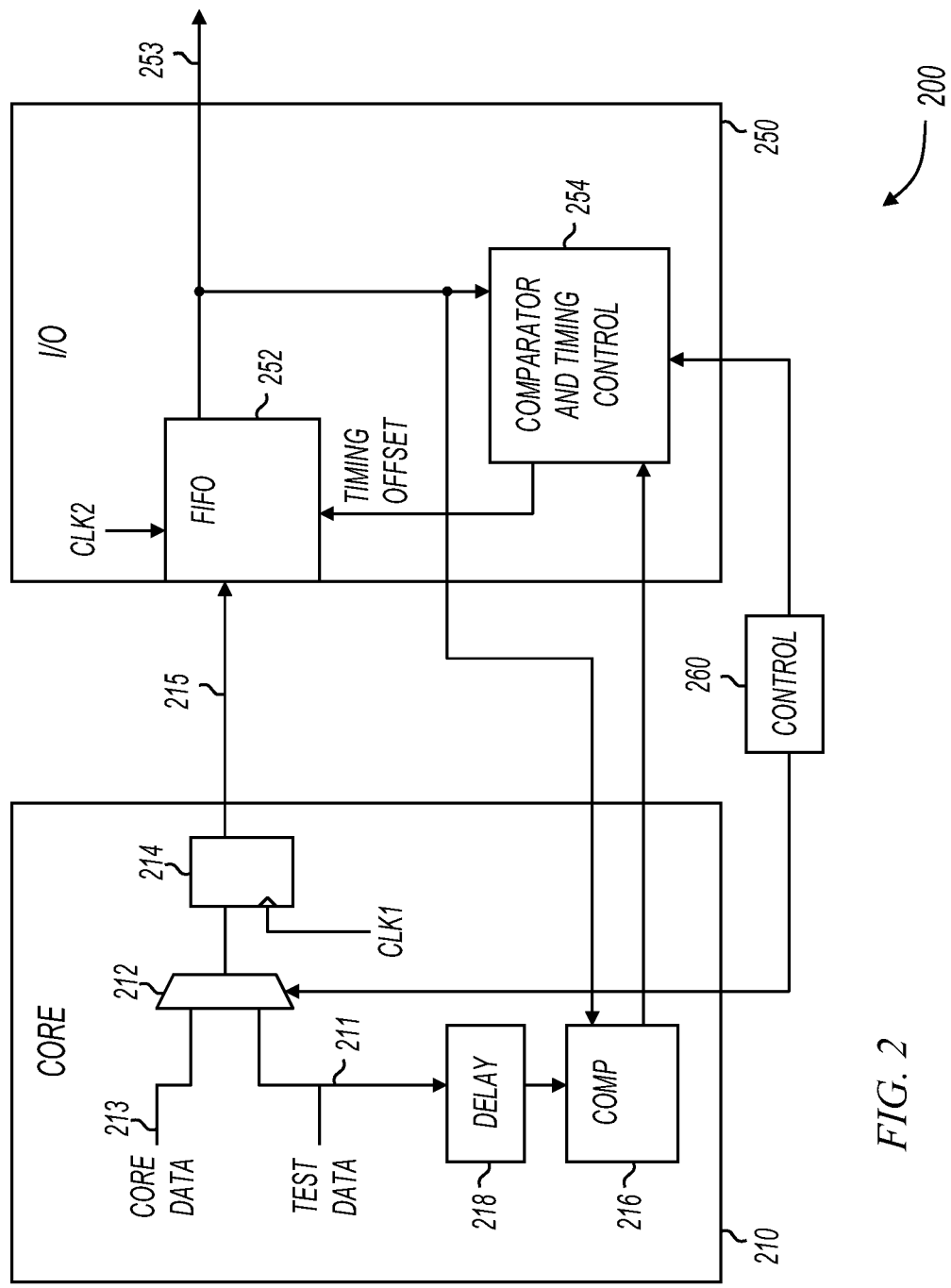
FIGS. 2 and 3 show integrated circuits in accordance with various embodiments of the present invention.

FIG. 2 shows an integrated circuit in accordance with various embodiments of the present invention. Integrated circuit 200 includes core circuit 210, input/output (I/O) circuit 250, and control circuit 260. Core circuit 210 is in a first clock domain as shown by clock signal CLK1, and I/O circuit 250 is in a second clock domain as shown by clock signal CLK2. Core circuit 210 includes multiplexer 212, sequential device 214, delay circuit 218, and comparator 216. I/O circuit 250 includes first in first out (FIFO) circuit 252 and comparator and timing control circuit 254. In operation, core circuit 210 provides data from sequential element 214 to I/O circuit 250. The data is selected by multiplexer 212 from either test data on node 211, or core data on node 213. I/O circuit 250 receives the data from core circuit 210 at FIFO 252 and provides the data off the integrated circuit at node 253.

FIFO 252 clocks data received from core circuit 210 using clock signal CLK2. CLK2 may have a different frequency and/or a different phase from clock signal CLK1. For example, CLK1 may be distributed throughout a core of an integrated circuit, and CLK2 may be distributed only about the I/O circuits on a periphery of an integrated circuit. In some embodiments, CLK1 and CLK2 may be the same frequency, but because of routing and delay differences, may have substantially different phase values. Also for example, CLK1 and CLK2 may be different frequency clock signals. Example embodiments of clock domains using different frequency clock signals are further described below with reference to FIG. 3.

FIFO 252 receives a timing offset value from comparator and timing control circuit 254 to set write pointers and read pointers within FIFO 252. This timing offset controls the amount of latency inserted in the data path by FIFO 252. For example, in some embodiments, FIFO 252 may delay data between node 215 and node 253 by a variable number of clock periods based on the timing offset received from comparator and timing control circuit 254.

When power is applied to integrated circuit 200, core circuit 210 and I/O circuit 250 communicate with another integrated circuit to determine the amount of delay in FIFO 252. For example, integrated circuit 200 may be used in a system such as system 100 (FIG. 1) as either integrated circuit 110 or integrated circuit 150. When power is applied to the system, both integrated circuits determine the amount of delay, or "latency" to insert in various parts of data paths to ensure reliable communications between the integrated circuits. Referring now back to FIG. 2, core circuit 210 and I/O circuit 250 include circuitry to reduce the time needed to perform link training when one or more circuits are placed in a reduced power state and then subsequently brought out of the reduced power state. For example, I/O circuit 250 may be put to sleep by shutting down clock signal CLK2. When I/O circuit 250 is brought back from the reduced power state by starting clock signal CLK2, the timing offset provided by comparator and timing control 254 is re-determined without having to perform a link training operation involving multiple integrated circuits. Instead, core circuit 210 and I/O circuit 250 communicate directly to determine the timing offset that matches the timing offset initially determined when power was first applied.

Core circuit 210 is shown having delay element 218 and comparator 216. Delay element 218 has a programmable delay which is set after initial link training, and that delay value remains set when I/O circuit 250 is in a reduced power state. When I/O circuit 250 is brought back from a reduced power state by restarting CLK2, control circuit 260 steers multiplexer 212 to provide test data from node 211 to I/O circuit 250. Control circuit 260 also provides control information to comparator and timing control circuit 254. Comparator and timing control circuit 254 compares the output of FIFO 252 with a known data sequence, and alters the timing offset information until a match is achieved. In some embodiments, the timing offset determined by the loop just described determines one or more timing offsets that ensure error free capture of data by FIFO 252, but does not necessarily determine the latency value that matches the latency value existing prior to the I/O circuit 250 being input to a reduced power state.

The test data output from FIFO 252 is provided to comparator 216 within core circuit 210. Comparator circuit 216 also receives delayed test data from delay circuit 218. Compare circuit 216 provides an indication of a match or no match to comparator and timing control circuit 254, which in turn alters the timing offset until a match is achieved. Because delay circuit 218 was set having a delay value after initial link training, the operation of comparator 216, delay circuit 218, and comparator and timing control circuit 254 can set a timing offset value for FIFO 252 that matches the timing offset existing prior to I/O circuit 250 being put in a reduced power state.

I/O circuit 250 is shown accentuating an output circuit. I/O circuit 250 may also include input circuitry. The input circuitry may also include a FIFO circuit with a latency that was set during an initial link training with multiple integrated circuits. The latency of the input circuit is re-established in the same manner as described above with respect to the output circuit.

Figure 3:
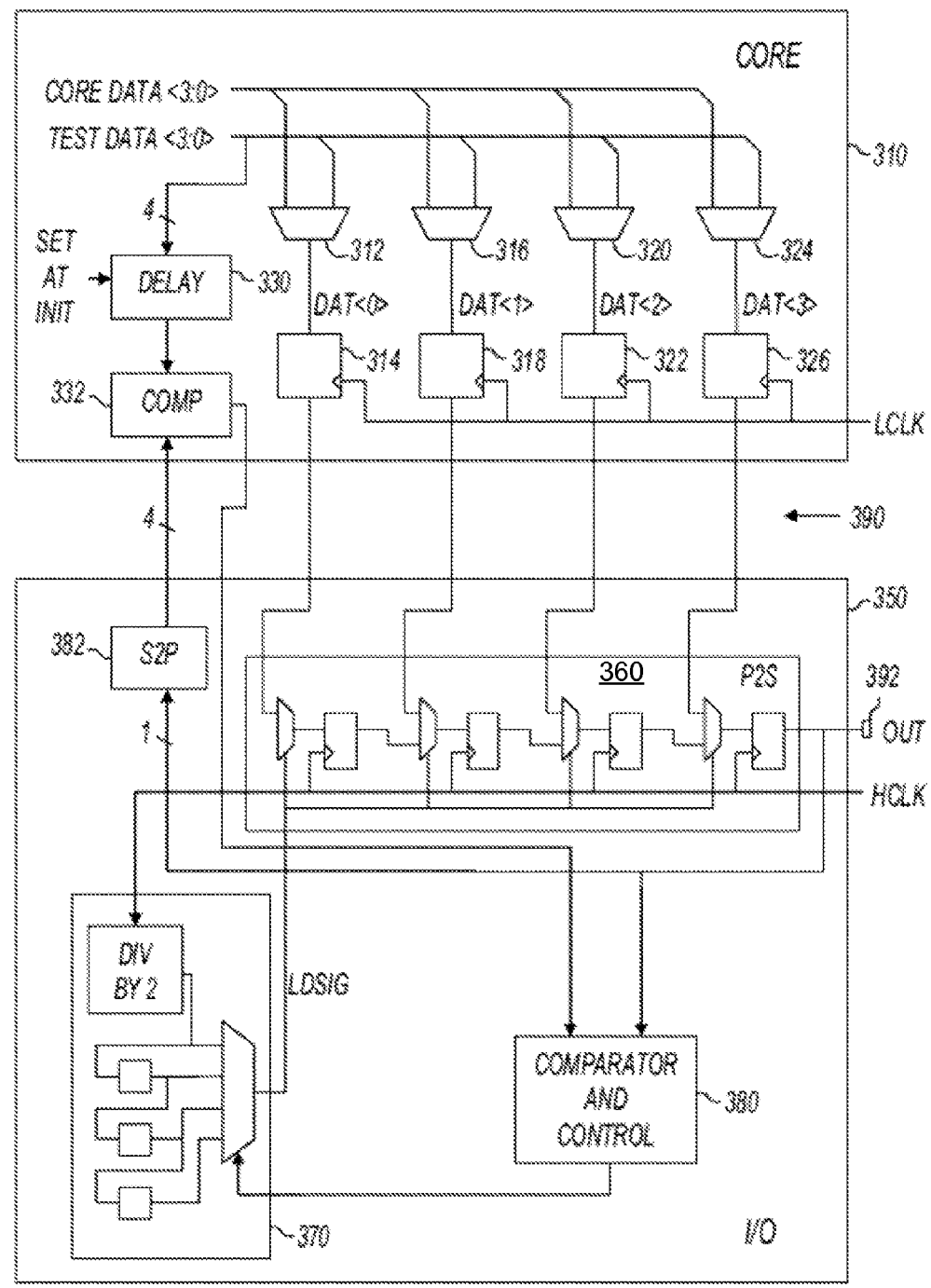

FIG. 3 shows an integrated circuit in accordance with various embodiments of the present invention. Integrated circuit 300 includes core circuit 310 and I/O circuit 350. Like I/O circuit 250 (FIG. 2), I/O circuit 350 is drawn to emphasize the output circuitry. Core circuit 310 is in a first clock domain that receives clock signal LCLK, and I/O circuit 350 is in a second clock domain that receives clock signal HCLK. In embodiments represented by FIG. 3, HCLK has a frequency of substantially four times the frequency of LCLK. In operation, core circuit 310 clocks data in parallel, shown at 390, to I/O circuit 350. I/O circuit 350 receives the parallel data from core circuit 310 and drives it serially at node 392 at substantially four times the rate at which it is received.

As described above with reference to FIGS. 1 and 2, when power is applied to integrated circuit 300, a link training operation is performed between multiple integrated circuits, and timing relationships are set up between core circuits and I/O circuits in multiple integrated circuits. Also as described with reference to FIG. 2, I/O circuit 350 may be put in a reduced power state by shutting off the clock signal HCLK. Power may be saved in part because power dissipating circuits are placed in a non-operational state when the clock is turned off.

Upon restarting the clock signal HCLK, various embodiments of the present invention re-determine the timing relationship between core circuit 310 and I/O circuit 350 without requiring a link training operation involving multiple integrated circuits. The remainder of the description of FIG. 3 focuses on methods and apparatus useful to re-determine the timing relationship between core circuit 310 and I/O circuit 350 that existed prior to HCLK being turned off. Further, portions of integrated circuit 300 are described while referencing the timing diagram shown in FIG. 4.

Core circuit 310 is shown having multiplexers 312, 316, 320, and 324, and sequential elements 314, 318, 322, and 326. Sequential elements 314, 318, 322, and 326 are clocked by LCLK (410, FIG. 4), and output parallel data (420, FIG. 4). Core circuit 310 is also shown having variable delay element 330 and comparator 332. When power is applied to core circuit 310 and link training is performed, variable delay element 330 has a delay value set that is related to the timing relationship determined during link training. This delay value is used to re-determine the proper timing relationships upon I/O circuit 350 reawakening from a low power state.

Figure 4:
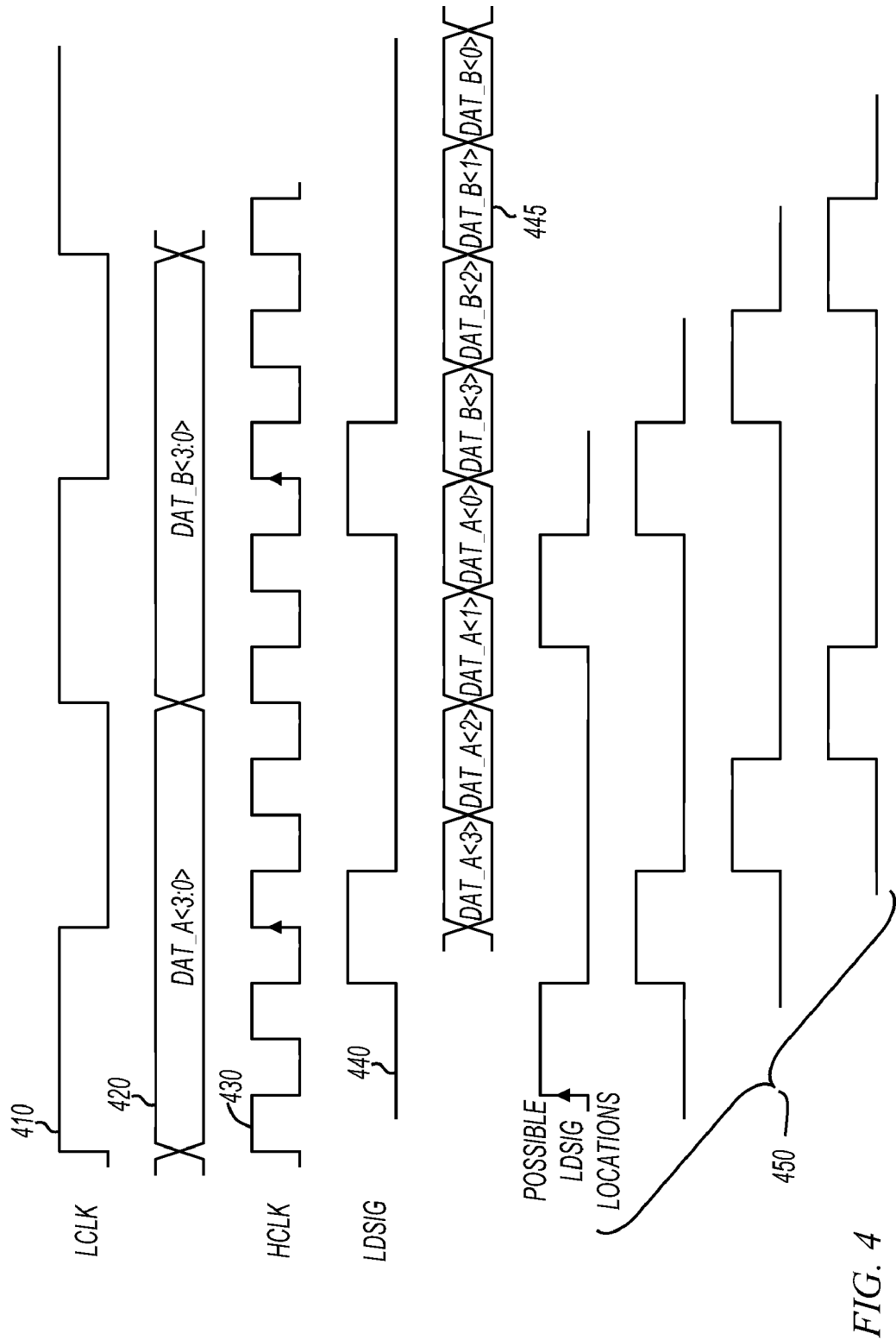
FIG. 4 shows a timing diagram.

I/O circuit 350 includes parallel-to-serial (P2S) circuit 360, serial-to-parallel (S2P) circuit 382, comparator and control circuit 380, and load signal generator 370. P2S circuit 360 clocks the parallel data with HCLK (430, FIG. 4), and outputs serial data (445, FIG. 4). Load signal generator 370 also receives HCLK. In response to a control signal from comparator and control circuit 380, load signal generator 370 provides one of four possible load signals (450, FIG. 4). The selected load signal is provided to parallel-to-serial circuit 360. The time location of the load signal determines the latency introduced in the data path by parallel-to-serial circuit 360. A representative load signal is shown in FIG. 4 at 440, and an output stream of data resulting therefrom is shown at 445.

When HCLK is shut down to put I/O circuit 350 in a reduced power state, the information describing the location of the load signal and the latency introduced by parallel-to-serial circuit 360 is lost. When I/O circuit 350 is brought out of a reduced power state and HCLK is restarted, the various blocks shown in FIG. 3 operate to re-determine the proper load signal location and time so as to provide a consistent amount of latency without having to re-perform a link training operation involving multiple integrated circuits.

I/O circuit 350 enters a reduced power state when HCLK is shut off by a control circuit (not shown). Further, when I/O circuit 350 is brought out of a low power state, HCLK is restarted by the control circuit, and operations are commenced to re-determine the latency to be introduced by parallel to serial circuit 360. For example, multiplexers 312, 316, 320, and 324 are switched to provide test data to I/O circuit 350 and comparator and control circuit 380 is commanded to begin a synchronization process to determine the correct load signal location.

In some embodiments, when I/O circuit 350 is brought out of a reduced power state, comparator and control circuit 380 causes load signal generator 370 to step through the possible load signal locations in time and receives the resulting data which would be output on node 392 as a result. Further, in some embodiments, comparator and control circuit 380 has knowledge of a test data sequence provided by core circuit 310, and comparator and control circuit 380 compares the received sequence received with the known sequence.

Comparator and control circuit 380 may determine that one or more load signal locations reliably transfer data from core circuit 310 to I/O circuit 350. After comparator and control circuit 380 determines possible valid locations for the load signal, comparator and control circuit 380 selects a load signal location in response to the operation of comparator 332. Comparator 332 compares data fed back from I/O circuit 350 with delayed test data delayed by delay circuit 330.

Serial-to-parallel circuit 382 is part of a feedback circuit that feeds back test data from output node 392 back to core circuit 310 for comparison with test data as originally sourced. The feedback loop further includes comparator circuit 332 to compare data received from serial to parallel circuit 382 with delayed test data. The test data is delayed at delay circuit 330 by an amount set at the original initialization, and comparator and control circuit 380 is able to re-determine the correct amount of latency in response thereto.

Figure 5:
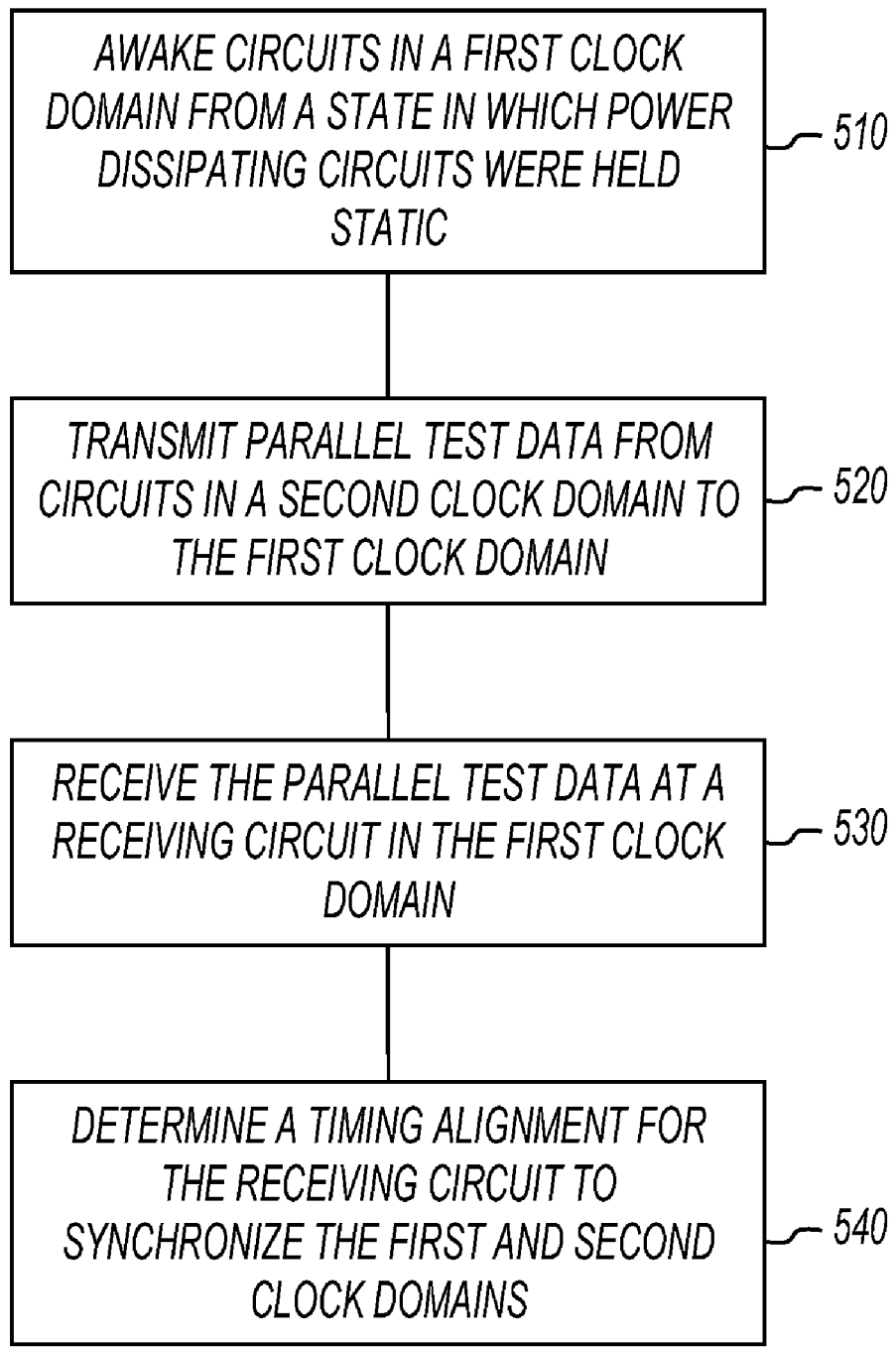
FIG. 5 shows a flowchart in accordance with various embodiments of the present invention.

FIG. 5 shows a flowchart in accordance with various embodiments of the present invention. In some embodiments, method 500 may be used to synchronize disparate clock domains. In some embodiments, method 500, or portions thereof, is performed by an input/output (I/O) circuit in an integrated circuit, embodiments of which are shown in the various figures. In other embodiments, method 500 is performed by a controller or memory device. Method 500 is not limited by the particular type of apparatus performing the method. The various actions in method 500 may be performed in the order presented, or may be performed in a different order. Further, in some embodiments, some actions listed in FIG. 5 are omitted from method 500.

Method 500 begins at 510 in which circuits in a first clock domain are awoken from a state in which power dissipating circuits were held static. For example, I/O circuits such as I/O circuit 250 (FIG. 2) or I/O circuit 350 (FIG. 3) may include circuits held static by the removal of a clock signal. The operations represented at 510 may correspond to the re-application of a clock signal to an I/O circuit as described above with reference to FIGS. 2 and 3.

At 520, parallel test data is transmitted from circuits in a second clock domain to the first clock domain. In various embodiments of the present invention, the second clock domain represents a clock domain in a core of an integrated circuit such as core circuit 210 (FIG. 2) or core circuit 310 (FIG. 3). Test data may be transmitted by steering multiplexers as shown in FIGS. 2 and 3. Further, test data may be transmitted from a test sequence generator such as a pseudo-random data generator, which may produce a repeatable pattern known to both the transmitter and receiver.

At 530, the parallel test data is received at a receiving circuit in the first clock domain. Referring now back to FIG. 3, the receiving circuit may be parallel-to-serial circuit 360 where test data is received in parallel, and serialized. At 540, a timing alignment is determined for the receiving circuit to synchronize the first and second clock domains. Again referring back to FIG. 3, the timing alignment may be determined by comparator and control circuit 380 cycling through the possible load signal locations in time, and further in response to comparator circuit 332 which compares test data fed back against test data delayed by an amount set during an initial link training sequence between multiple integrated circuits.

Figure 6:
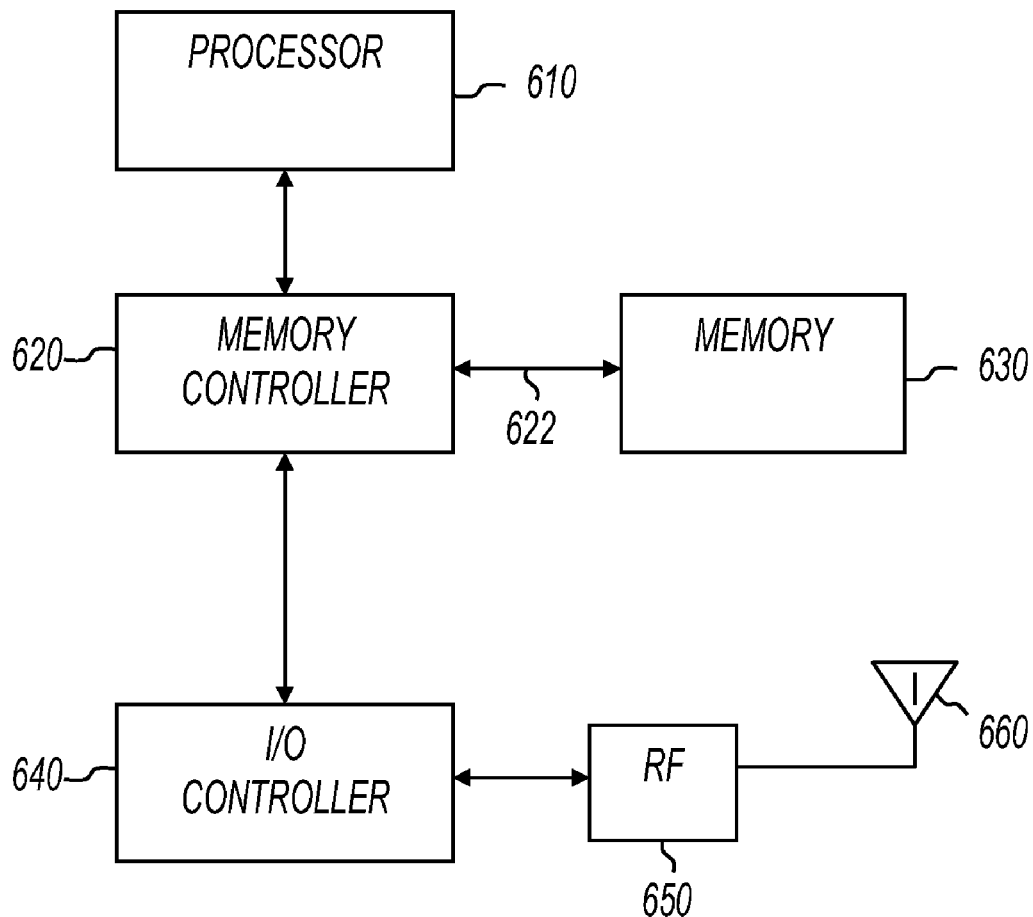
FIGS. 6 and 7 show diagrams of electronic systems in accordance with various embodiments of the present invention.

FIG. 6 shows an electronic system in accordance with various embodiments of the present invention. Electronic system 600 includes processor 610, memory controller 620, memory 630, input/output (I/O) controller 640, radio frequency (RF) circuits 650, and antenna 660. In operation, system 600 sends and receives signals using antenna 660, and these signals are processed by the various elements shown in FIG. 6. Antenna 660 may be a directional antenna or an omni-directional antenna. As used herein, the term omni-directional antenna refers to any antenna having a substantially uniform pattern in at least one plane. For example, in some embodiments, antenna 660 may be an omni-directional antenna such as a dipole antenna, or a quarter wave antenna. Also for example, in some embodiments, antenna 660 may be a directional antenna such as a parabolic dish antenna, a patch antenna, or a Yagi antenna. In some embodiments, antenna 660 may include multiple physical antennas.

Radio frequency circuit 650 communicates with antenna 660 and I/O controller 640. In some embodiments, RF circuit 650 includes a physical interface (PHY) corresponding to a communications protocol. For example, RF circuit 650 may include modulators, demodulators, mixers, frequency synthesizers, low noise amplifiers, power amplifiers, and the like. In some embodiments, RF circuit 650 may include a heterodyne receiver, and in other embodiments, RF circuit 650 may include a direct conversion receiver. In some embodiments, RF circuit 650 may include multiple receivers. For example, in embodiments with multiple antennas 660, each antenna may be coupled to a corresponding receiver. In operation, RF circuit 650 receives communications signals from antenna 660, and provides analog or digital signals to I/O controller 640. Further, I/O controller 640 may provide signals to RF circuit 650, which operates on the signals and then transmits them to antenna 660.

Processor 610 may be any type of processing device. For example, processor 610 may be a microprocessor, a microcontroller, or the like. Further, processor 610 may include any number of processing cores, or may include any number of separate processors.

Memory controller 620 provides a communications path between processor 610 and other devices shown in FIG. 6. In some embodiments, memory controller 620 is part of a hub device that provides other functions as well. As shown in FIG. 6, memory controller 620 is coupled to processor 610, I/O controller 640, and memory 630.

Memory 630 may be any type of memory technology. For example, memory 630 may be random access memory (RAM), dynamic random access memory (DRAM), static random access memory (SRAM), nonvolatile memory such as FLASH memory, or any other type of memory.

Memory 630 may represent a single memory device or a number of memory devices on one or more memory modules. Memory controller 620 provides data through bus 622 to memory 630 and receives data from memory 630 in response to read requests. Commands and/or addresses may be provided to memory 630 through conductors other than bus 622 or through bus 622. Memory controller 630 may receive data to be stored in memory 630 from processor 610 or from another source. Memory controller 620 may provide the data it receives from memory 630 to processor 610 or to another destination. Bus 622 may be a bi-directional bus or unidirectional bus. Bus 622 may include many parallel conductors. The signals may be differential or single ended. In some embodiments, bus 622 operates using a forwarded, multiphase clock scheme.

Memory controller 620 is also coupled to I/O controller 640, and provides a communications path between processor 610 and I/O controller 640. I/O controller 640 includes circuitry for communicating with I/O circuits such as serial ports, parallel ports, universal serial bus (USB) ports, and the like. As shown in FIG. 6, I/O controller 640 provides a communications path to RF circuits 650.

Any of the integrated circuits in system 600 may include the disparate clock domain synchronization embodiments described with reference to the previous figures. For example, memory controller 620 may include core circuit 310 and I/O circuit 350 (FIG. 3). In some embodiments, memory controller 620 and memory 630 undergo a link training operation on power up, and various circuits within memory controller 620 and memory 630 set latency values as a result. Thereafter various clock domains within memory controller 620 and/or memory 630 may enter a reduced power state. When coming out of the reduced power state, the various embodiments of the present invention may be utilized to provide clock domain synchronization without requiring the link training.

Figure 7:
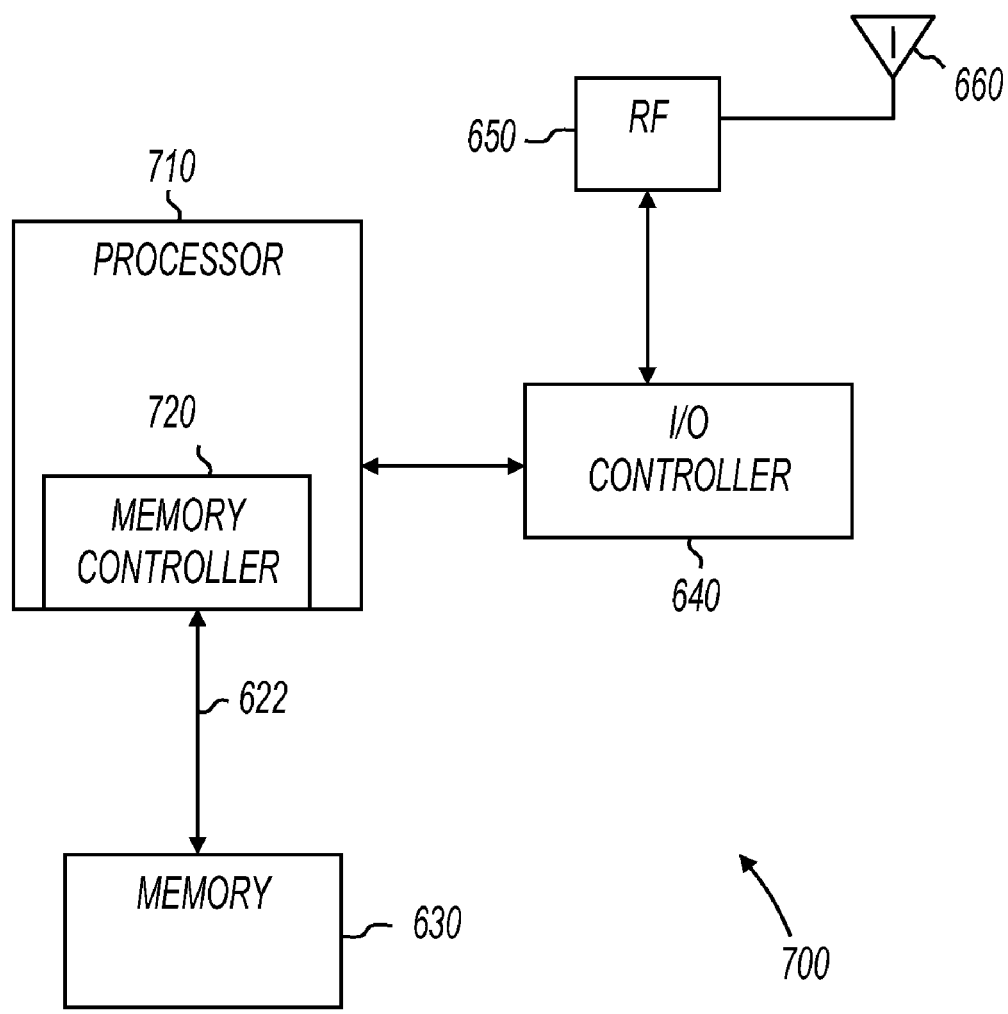

FIG. 7 shows an electronic system in accordance with various embodiments of the present invention. Electronic system 700 includes memory 630, I/O controller 640, RF circuits 650, and antenna 660, all of which are described above with reference to FIG. 6. Electronic system 700 also includes processor 710 and memory controller 720. As shown in FIG. 7, memory controller 720 is included in processor 710. Processor 710 may be any type of processor as described above with reference to processor 610 (FIG. 6). Processor 710 differs from processor 610 in that processor 710 includes memory controller 720, whereas processor 610 does not include a memory controller.

Example systems represented by FIGS. 6 and 7 include desktop computers, laptop computers, cellular phones, personal digital assistants, wireless local area network interfaces, or any other suitable system. Many other systems uses for disparate clock domain synchronization exist. For example, the disparate clock domain synchronization embodiments described herein may be used in a server computer, a network bridge or router, or any other system with or without an antenna.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. An integrated circuit comprising:
    a core circuit and an input/output (I/O) circuit operating in different clock domains, the core circuit including circuitry to conditionally steer parallel test data to the I/O circuit at a first frequency, the I/O circuit including a parallel-to-serial converter circuit to convert the parallel test data to serial test data at a second frequency, where the second frequency is higher than the first frequency, the I/O circuit further including a serial-to-parallel converter circuit to convert the serial test data to parallel feedback test data;
    control circuitry to steer the parallel test data from the core circuit to the I/O circuit, and to influence operation of the parallel-to-serial converter to allow synchronization between the different clock domains when the I/O circuit awakes from a reduced power non-operational state; and
    a data path from the I/O circuit to the core circuit to return to the core circuit the parallel feedback test data, wherein the core circuit includes a comparator to compare the parallel test data against the parallel feedback test data to determine a timing offset between the different clock domains, and to compare the timing offset between the different clock domains with a stored timing offset determined during a link training between the circuits of the different clock domains, the link training occurring prior to the reduced power state, and wherein synchronization between the different clock domains includes adjusting the timing offset between the different clock domains to match the stored timing offset.

2. The integrated circuit of claim 1 wherein the serial test data is clocked at a rate four times a rate at which the parallel test data is clocked.

3. The integrated circuit of claim 1 wherein the parallel-to-serial converter includes a shift register responsive to a load signal to determine when the shift register is loaded, and wherein the control circuitry influences operation of the parallel-to-serial converter by modifying the load signal.

4. An integrated circuit comprising:
    a core circuit coupled to operate at a first clock frequency; and
    an input/output (I/O) circuit coupled to operate at a second clock frequency, the I/O circuit further coupled to receive a set of parallel data from the core circuit and to drive serial data off the integrated circuit;
    wherein the core circuit includes
        circuitry to source either operational data or test data to the I/O circuit, and
        a delay element to store a timing offset determined during a link training between the core circuit and the I/O circuit, the link training occurring prior to the I/O circuit receiving the set of parallel data from the core circuit, and the I/O circuit includes
        a parallel-to-serial converter having a programmable timing offset, the parallel-to-serial converter coupled to receive the set of parallel data from the core circuit,
        a comparator to compare the programmable timing offset with the stored timing offset, and
        a control block to test validity of serial data output from the parallel-to-serial converter and to modify the programmable timing offset of the parallel-to-serial converter to match the stored timing offset.

5. The integrated circuit of claim 4 further comprising a loopback data path from the I/O circuit to the core circuit to loop the test data back to the core circuit as feedback test data.

6. The integrated circuit of claim 5 wherein the core circuit further comprises a second comparator to compare the test data with the feedback test data.

7. The integrated circuit of claim 4 wherein the core circuit comprises a memory array.

8. The integrated circuit of claim 4 wherein the core circuit comprises a memory controller circuit.

9. The integrated circuit of claim 4 wherein the second clock frequency is four times the first clock frequency.

10. The integrated circuit of claim 4 wherein the programmable timing offset of the parallel-to-serial converter is modified by a load signal from the control block.

11. A method comprising:
    awaking circuits in a first clock domain of an integrated circuit from a reduced power state in which power dissipating circuits were held static;
    transmitting test data from circuits in a second clock domain of the integrated circuit to the first clock domain of the integrated circuit;
    receiving the test data at a receiving circuit in the first clock domain of the integrated circuit;
    transmitting the test data from the first clock domain of the integrated circuit back to the second clock domain of the integrated circuit;
    comparing the test data as originally transmitted to the first clock domain of the integrated circuit with the test data received back from the first clock domain of the integrated circuit to determine a timing offset between the clock domains;

retrieving a stored timing offset determined during a link training between the circuits of the first clock domain of the integrated circuit and the circuits of the second clock domain of the integrated circuit, the link training occurring prior to the reduced power state; and determining a timing alignment for the receiving circuit to synchronize the first and second clock domains of the integrated circuit so that the timing offset between the clock domains matches the stored timing offset.

12. The method of claim 11 wherein receiving the test data comprises receiving the test data in parallel at a parallel-to-serial converter.

13. The method of claim 12 wherein determining a timing alignment comprises determining a load time for the parallel-to-serial converter.

14. An electronic system comprising:
an antenna;
a radio frequency circuit coupled to the antenna;
a controller coupled to the radio frequency circuit; and
a memory device coupled to the controller, the memory device including
a core circuit and an input/output (I/O) circuit operating in different clock domains, the core circuit including circuitry to conditionally steer parallel test data to the I/O circuit, the I/O circuit including a parallel-to-serial converter circuit to convert the parallel test data to serial test data, the I/O circuit further including a serial-to-parallel converter circuit to convert the serial test data to parallel feedback test data, and control circuitry to steer the parallel test data from the core circuit to the I/O circuit and to influence operation of the parallel-to-serial converter to allow synchronization between the different clock domains when the I/O circuit awakes from a reduced power non-operational state, and a data path from the I/O circuit to the core circuit to return to the core circuit the parallel feedback test data, wherein the core circuit includes a comparator to compare the parallel test data against the parallel feedback test data to determine a timing offset between the different clock domains, and to compare the timing offset between the different clock domains with a stored timing offset determined during a link training between the circuits of the different clock domains, the link training occurring prior to the reduced power state, and wherein synchronization between the different clock domains includes adjusting the timing offset between the different clock domains to match the stored timing offset.

15. The electronic system of claim 14 wherein the serial test data is clocked at a rate four times a rate at which the parallel test data is clocked.

16. The electronic system of claim 14 wherein the parallel-to-serial converter includes a shift register responsive to a load signal to determine when the shift register is loaded, and the control circuitry influences operation of the parallel-to-serial converter by modifying the load signal.

* * * * *